March 11, 1941.  W. ZETZSCHE ET AL  2,234,330
METHOD OF PRODUCING EXTENSIBLE SLIVERS OR ROVINGS AND MEANS THEREFOR
Filed Dec. 7, 1938  5 Sheets-Sheet 1

Walther Zetzsche
Franz Schiele
Georg Ludwig
Wolf Rodenacker
Emil Baumann
Richard Hartmuth Inventors By Their Attorneys Fig. 5.
Fig. 6
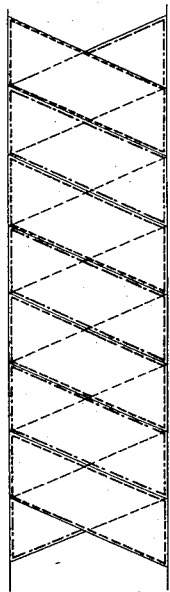
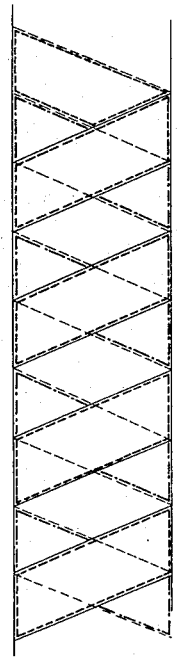
Fig. 7
Fig. 8
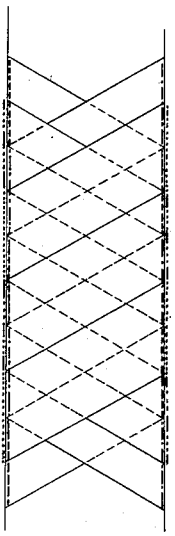
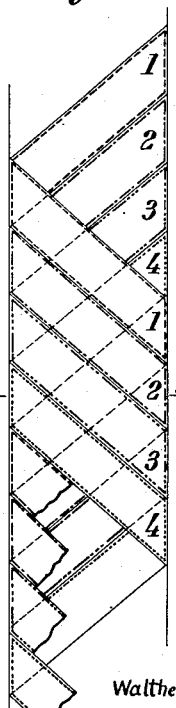
Fig. 9
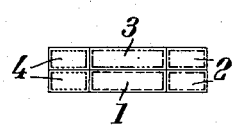
Walther Zetzsche  Wolf Rodenacker
Franz Schiele    Emil Baumann     Inventors
Georg Ludwig     Richard Hartmuth
By Their Attorneys March 11, 1941.   W. ZETZSCHE ET AL   2,234,330
METHOD OF PRODUCING EXTENSIBLE SLIVERS OR ROVINGS AND MEANS THEREFOR
Filed Dec. 7, 1938   5 Sheets-Sheet 4

Walther Zetzsche
Franz Schiele
Georg Ludwig
Wolf Rodenacker
Emil Baumann
Richard Hartmuth Inventors By Their Attorneys Patented Mar. 11, 1941

2,234,330

UNITED STATES PATENT OFFICE 2,234,330

METHOD OF PRODUCING EXTENSIBLE SLIVERS OR ROVINGS AND MEANS THEREFOR

Walther Zetzsche and Franz Schiele, Premnitz, and Georg Ludwig, Rathenow, and Wolf Rodenacker and Emil Baumann, Wolfen, Kreis Bitterfeld, and Richard Hartmuth, Dessau, Germany, assignors, by mesne assignments, to Walther H. Duisberg, New York, N. Y.

Application December 7, 1938, Serial No. 244,426
In Germany December 9, 1937

4 Claims. (Cl. 164—17)

Our present invention relates to the production of extensible slivers or rovings consisting of rayon staple fibers and to the machinery involved in this production.

Several processes and apparatus have been proposed for producing from bundles of continuous rayon fibers an extensible sliver or roving in such a manner that the original parallel position of the individual fibers is retained without the intermediate use of a carding machine or the like.

In spinning such a sliver or roving of rayon staple fiber to a satisfactorily uniform yarn by one of the processes for spinning worsted yarn or cotton, the number of passages up to the finished spun thread should be as small as possible and to this end the following requirements must be met:

1. The sliver or roving must have a high capacity for being drawn without tufts of staple fiber being withdrawn therefrom.
2. By staple distribution as uniform as possible a good coherence of the sliver or roving must be ensured.
3. The slivers and rovings must present the greatest possible uniformity over the shortest cuts of for example a few millimeters, as well as over considerable lengths of cut.

It is therefore an object of the present invention to provide a process by which an extensible sliver is obtained which has the above described characteristics.

An additional object of the invention is the provision of a method which leads to a roving consisting of rayon staple fibers without the intermediate stages of carding, combing, picking, etc.

A further object is the production of a novel kind of composite staple fiber sliver or roving consisting of rayon staple fibers of uniform length arranged in superposed layers, the ends of said individual fibers forming lines obliquely to the longitudinal direction of the sliver.

A further object of the invention resides in the provision of a cutting machinery of simple construction, which will reduce the entire bundle of continuous rayon fibers to staple length without essentially disturbing the parallel relation of the individual fibers.

These and further objects will become apparent from the following detailed specification.

Reference is made to the accompanying drawings in which

Figure 1 is a diagram of the cut effected in a tubular body of rayon filaments according to the present invention, Figure 2 is a diagrammatic plan view of a sliver cut according to this invention and drawn out after cutting, Figure 3 is a diagrammatic plan view of an undrawn sliver, Figure 4 is a diagrammatic view of a threefold cutting device according to this invention, Figure 5 is a diagrammatic plan view showing the position of the cut filaments in a sliver produced by combining two flattened tubular assemblies cut in the same direction, Figure 6 is a diagrammatic plan view showing the position of the cut filaments in a sliver produced by combining two flattened tubular assemblies cut in opposite directions, Figure 7 is a diagrammatic plan view showing the position of the cut filaments in a sliver produced by combining four flattened tubular assemblies cut in the same direction, Figure 8 is a diagrammatic plan view showing the position of the cut filaments in a sliver produced by combining four flattened tubular assemblies cut in the same direction, the lines of cut in the sliver being displaced by half a fiber length, Figure 9 is a diagrammatic cross sectional view on line 9—9 of Figure 8.

Figure 1:
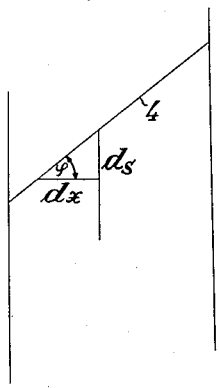
Figure 2:
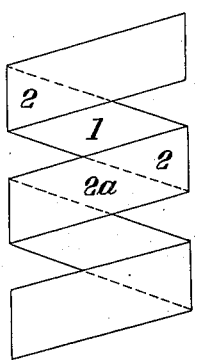
Figure 3:
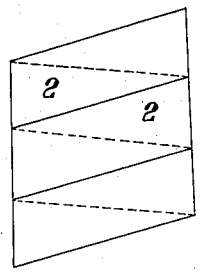

In Figures 1 to 3 the arrow indicates the direction of travel of a tubular assembly of fibers or a number of individual slivers of continuous fibers laid on the periphery of a cylindrical support to form a tubular assembly. This tubular body of filaments is severed by a helical cut indicated in Figure 1 by the upwardly inclined line 4. If such a helically cut tubular assembly is stretched in the longitudinal direction the ideal staple distribution and covering are lost, for in pressing flat such a cut and extended tube 1 (Figure 2) there are produced parts of varying thickness 2, 2a.

The uniform distribution required of the staple, as shown in Figure 3, is attained by pressing flat the non-extended cut tubular assembly. There is thus produced a sliver with an indefinite number of staple fibers displaced one with respect to the other. It is seen in Figure 1 that by means of the helical cut each fiber is shifted in respect of its neighbour by the small horizontal distance $d_x$ and by the small vertical distance $d_s = d_x \cdot \text{tangent } s$. Under this condition there is obtained a band of good coherence.

Figure 4:
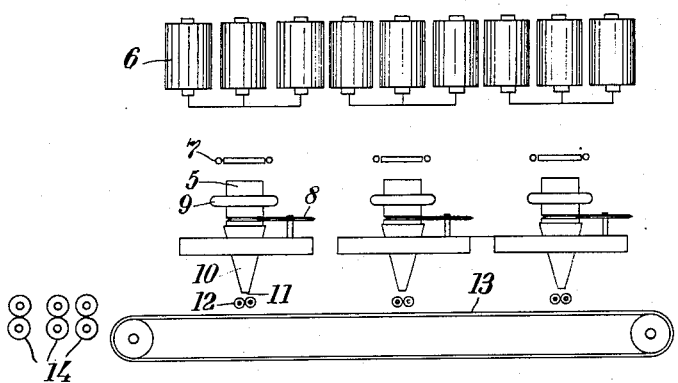
Figure 10:
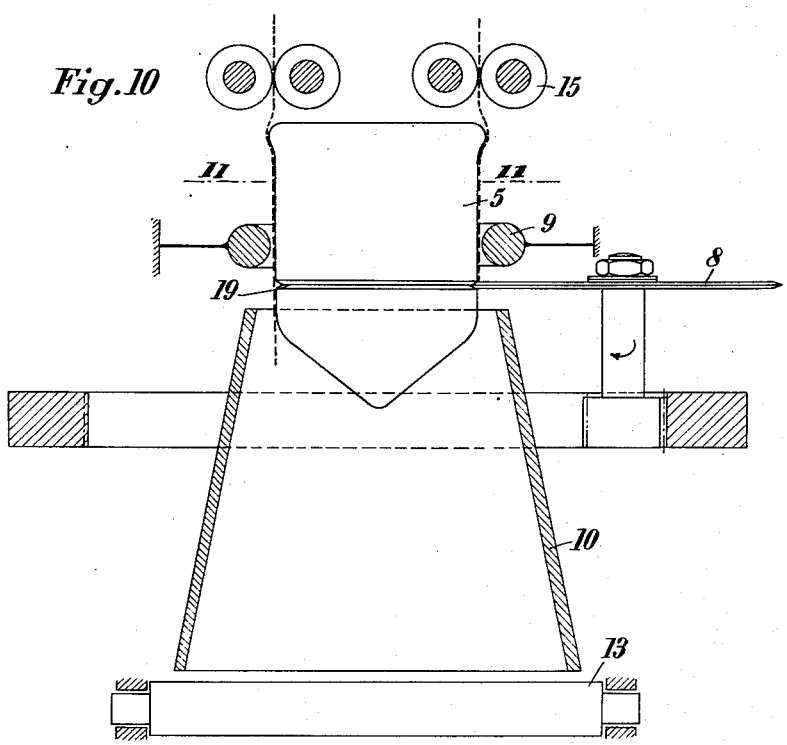
Figure 10 is a vertical section.

If now instead of a single helically cut band represented in Figure 3, several of such flattened tubular bands are produced by several cutting devices as indicated in Figure 4, there is a large number of possible ways of arranging these bands with reference to each other. In this manner a very extensive and satisfactory distribution of the staple is obtained in the doubled helical by cut slivers. In Figures 5 to 9 some methods are shown in which the slivers from several cutting devices can be laid together and doubled. Figure 5 shows a band which has issued from two cutting devices in each of which the cutting knife rotates in the same direction. Figure 6 is a composite sliver produced from two helical slivers produced by cutting with two cutting devices in which the directions of rotation of the cutting discs are opposed. Figure 7 shows the positions of the helical surfaces in a sliver produced by four cutting devices in which all the knives have rotated in the same direction. The diagram shows that the fiber density is uniform over the whole breadth of the final sliver. In Figure 8 the sliver has also been produced by four cutting devices. In this case the slivers are so superimposed, that two of the helical surfaces are displaced to the extent of half a staple length with respect of the other two surfaces, so that between the individual helical lines there is an overlap. Correspondingly, a number of variations in the overlap of the individual fibers are possible. Figure 9 is a cross section through the sliver of Figure 8 at line 9—9.

For the practical application of the method various kinds of apparatus are suitable.

Figure 4 is a diagrammatic view of a three fold cutting device, by which a three fold superimposed helically cut sliver is obtained. The most essential part is a cylindrical body 5 on the surface of which the uncut slivers of rayon fibers are laid and fed, in an assembly resembling a tube, from the supply spools 6 and over the guides 7; the fibers are cut by the rotating knife 8 in cooperation with the core 5. The cut but still coherent tubular assembly corresponding with Figure 3, which is maintained against the cylindrical body 5 by a ring shaped member 9 is passed into the funnel 10 without any extension of its length. The funnel is so shaped that without any lateral bunching the cut tubular assembly is flattened, that is to say the funnel terminates at its lower end in a slot opening 11, the length of which corresponds with half the periphery of the cylindrical body or core 5. From these slot openings the flattened slivers are passed by guiding rolls 12 to a conveyer belt 13 where they are laid together with a certain overlap to be subjected to drawing on a drawing frame 14 or the like.

Figure 11:
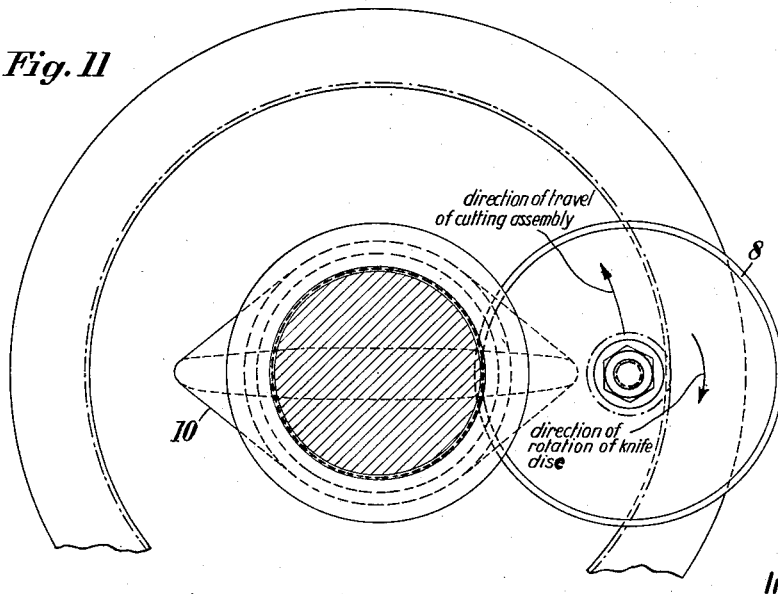
Figure 11 is a horizontal section on line 11—11 of Figure 10, through parts of a machine operating on the said principle.
Figure 12:
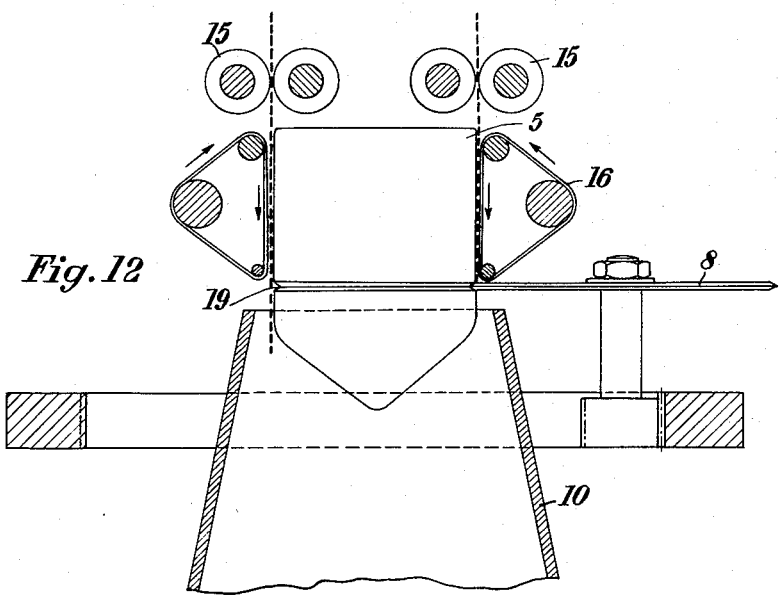
Figures 12 and 13 show modifications respectively.
Figure 13:
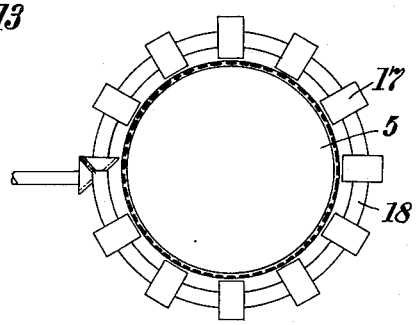

In Figures 10 to 12 9 represents a device for holding the tubular assembly of fibers which is to be cut on the surface of the cylindrical body 5. The apparatus according to the invention are more specifically shown in Figures 10 to 13. In Figure 12 the slivers fed by the cylinders 15 are held to the body 5 by means of a rubbing leather as used in drawing frames 16 which feeds them to the cutting device. In Figure 13 there are arranged around the cylinder 5 small rollers 17 which are driven by a flexible shaft 18, these rollers serving to hold the tubular assembly well up to the knife.

Figure 14:
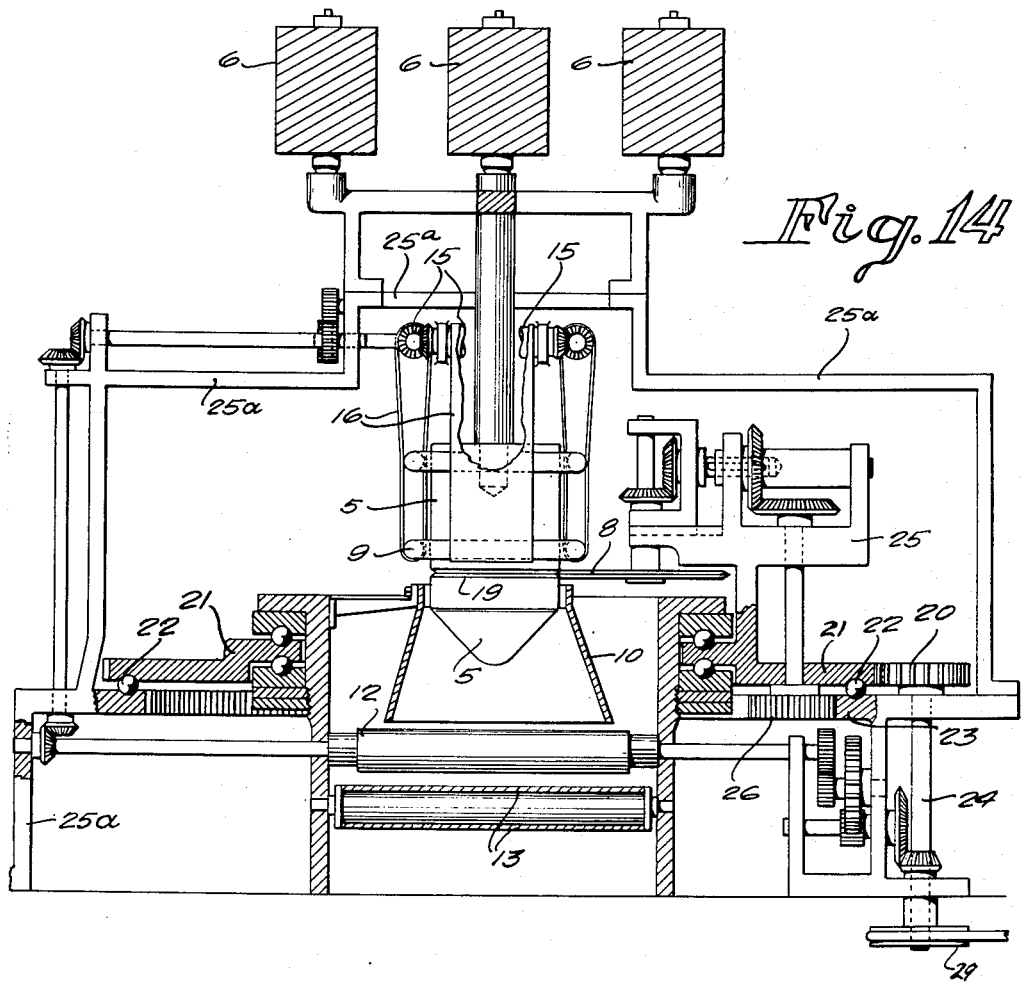
Figure 14 shows an arrangement by which the rotating knife 8 is driven to run around the periphery of the core 5.

The knife 8 rotates, as will be gathered from Figure 11, around the cylinder 5. Fig. 14 shows a drive arranged for rotating knife 8 around cylinder 5 while at the same time causing said knife to revolve about its own axis. The power supplied to driving disk 29 is transmitted in part to shaft 24 and pinion 20, said pinion is in engagement with and drives ring 21 resting on ball bearings 22 and thereby on fixed ring 23. Rotatable ring 21 carries a frame 25 upon which is arranged a bevel gear system connecting pinion 26 to rotating knife 8. Fixed ring 23 which is a part of stationary frame 25a has a geared rim on its inner side which engages pinion 26. When pinion 26 travels around cylinder 5 with frame 25 it is thereby caused to rotate about its own axis and to transmit said movement to knife 8 by means of a bevel gear drive. The power not transmitted to pinion 20 by shaft 24 is used to drive guide rollers 12 and feed cylinders 15. Spools 6 and cylindrical body 5 are supported as shown in the drawings.

The operation of the device shown by way of example in Fig. 14 is as follows. The slivers pass from supply spools 6 through feed cylinders 15 and are guided by means of guide belt 16 passing over member 9, so as to pass over the cylindrical surface of body 5. While passing over groove 19 in cylindrical body 5 the downwardly moving slivers are cut by rotating knife 8 which rotates not only about its own axis but also about cylindrical body 5 as shown in Fig. 11. The cut slivers then pass through funnel 10 whereby the cut tubular assembly is flattened, whereupon the flattened slivers are passed through guiding rolls 12 onto conveyor belt 13. The speed of the knife 8 and the speed of travel of the assembly of artificial fibers may be so adjusted with respect to each other that various angles of cut and thereby various overlappings of the individual fibers may be obtained.

Of special importance is the form of the funnel indicated by 10. If, for example, four continuous slivers each 35 millimeters wide are to be fed by the feeding devices around the cylinder 5 the latter will have a peripheral circumference of 140 millimeters and a diameter of 45 millimeters. The cut assembly of fibers has at the entry of the funnel a circular cross section corresponding with that of the body 5. The funnel 10 now guides the helical assembly and flattens it into the form of a band, which operation must not be accompanied by any bunching of the band because otherwise the overlap would be irregular. The funnel 10 must, therefore, when the dimensions are those just given, have a length of slot of 70 millimeters.

It may be added that the taking-off device indicated by 13 must also be adjusted to the speed of travel in such a manner that no undesired longitudinal stretching may occur.

We claim:

1. A method of producing an extensible sliver or roving of rayon staple fibers, which comprises forming a tube-like assembly of a sliver of continuous rayon fibers, continuously passing said assembly in its longitudinal direction over a core having a round cross section, cutting said assembly by means of a knife rotating around said core, withdrawing said assembly from said core thereby effecting a helical cut in said tube-like assembly, and flattening said tube-like assembly to form an extensible flat sliver or roving.

2. A method of producing an extensible sliver or roving of rayon staple fibers, which comprises forming a tube-like assembly of a sliver of continuous rayon fibers, continuously passing said assembly in its longitudinal direction over a core having a round cross section, cutting said assembly by means of a knife rotating around said core, withdrawing said assembly from said core thereby effecting a helical cut in said tube-like assembly, flattening said tube-like assembly to form an extensible flat sliver or roving and depositing said sliver or roving on a conveyor band.

3. A method of producing an extensible sliver or roving of rayon staple fibers, which comprises forming a tube-like assembly of a sliver of continuous rayon fibers, continuously passing said assembly in its longitudinal direction over a core having a round cross section, cutting said assembly by means of a knife rotating around said core, withdrawing said assembly from said core thereby effecting a helical cut in said tube-like assembly, flattening said tube-like assembly to form an extensible flat sliver or roving and depositing said sliver or roving on a conveyor band, combining several slivers or rovings thus formed and drawing the same on a drawing frame.

4. An apparatus of the character described comprising in combination a core having a round cross section, feeding means adapted to feed a tube-like assembly of continuous fibers to said core in its longitudinal direction, guiding means arranged around said core to maintain said assembly in position, cutting means rotating around said core with its cutting blade against said core, and collecting means arranged at the end of said core, comprising a funnel having a slit-shaped lower opening with a length at least equal to one half of the peripheral circumference of said core.

WALTHER ZETZSCHE.
FRANZ SCHIELE.
GEORG LUDWIG.
WOLF RODENACKER.
EMIL BAUMANN.
RICHARD HARTMUTH.